(12) United States Patent
Paré

(10) Patent No.: US 8,177,253 B2
(45) Date of Patent: May 15, 2012

(54) ACCESSORY FOR A LOCKING ASSEMBLY

(76) Inventor: André Paré, St-Charles-de-Drummond (CA)

(*) Notice: Subject to any disclaimer, the term of this patent is extended or adjusted under 35 U.S.C. 154(b) by 36 days.

(21) Appl. No.: 12/658,340

(22) Filed: Feb. 8, 2010

(65) Prior Publication Data

US 2010/0213689 A1    Aug. 26, 2010

Related U.S. Application Data

(63) Continuation-in-part of application No. 11/810,757, filed on Jun. 6, 2007, now abandoned.

(51) Int. Cl.
*B60R 25/10* (2006.01)
*B60D 1/28* (2006.01)

(52) U.S. Cl. .......... 280/507; 340/426.22; 340/431; 340/687; 340/686.4

(58) Field of Classification Search .......... 280/507; 340/431, 426.22, 426.23, 686.4, 687
See application file for complete search history.

(56) References Cited

U.S. PATENT DOCUMENTS

| | | | | |
|---|---|---|---|---|
| 2,641,124 A * | 6/1953 | Gallagher et al. | ............. | 70/232 |
| 2,656,706 A * | 10/1953 | Lucas et al. | ............. | 70/232 |
| 4,980,667 A * | 12/1990 | Ames | ............. | 340/427 |
| 5,903,219 A * | 5/1999 | Chen | ............. | 340/574 |
| 6,281,793 B1 * | 8/2001 | Haimovich et al. | ........ | 340/545.1 |
| 6,980,096 B1 * | 12/2005 | Washington et al. | ......... | 340/431 |

* cited by examiner

*Primary Examiner* — Paul N Dickson
*Assistant Examiner* — Wesley Potter
(74) *Attorney, Agent, or Firm* — Eric Fincham

(57) ABSTRACT

A device for use with an anti-theft locking assembly which comprises an enclosure, a noise emitter mounted within the enclosure, a battery, and a control circuit, an actuator extending externally of the enclosure and being designed to be plugged into a first actuator receptor on a towing vehicle or a second actuator receptor on the locking assembly, the noise emitter being activated when the actuator is unplugged from one of the receptors. The device will strongly remind the user that the anti-theft locking device is to be connected.

4 Claims, 2 Drawing Sheets

ACCESSORY FOR A LOCKING ASSEMBLY

This application is a Continuation-In-Part of application Ser. No. 11/810,757 filed Jun. 6, 2007 now abandoned, the teachings of which are hereby incorporated by reference.

FIELD OF THE INVENTION

The present invention relates to locking devices and more particularly, relates to an accessory for a locking assembly.

BACKGROUND OF THE INVENTION

Theft, as it relates to vehicles, is an ongoing problem. Such theft can range from stealing the contents of a vehicle to the theft of the vehicle itself. One particular problem relates to trailers.

Various types of trailers are widely used including RV type trailers as well as commercial trailers utilized to transport goods from one location to a second location. Often the theft of the trailer will occur when the trailer is unattended. In order to prevent such theft, some trailers utilize devices such as padlocks and chains for attaching a trailer to an adjacent fixed object such as a post or the like. However, such chains and padlocks can be defeated by use of bolt cutters, torches, and the like. Even when the trailer is attached to its own vehicle, theft can occur when the trailer is unattended. Again, various tools or implements can be utilized to detach the trailer and steal the same.

In order to overcome the above, it has been proposed in the art to utilize locking assemblies such as the one shown in U.S. Pat. No. 7,040,646, the disclosure which is hereby incorporated by reference. The locking assembly shown in this patent can be utilized for securing the trailer hitch such that the trailer cannot be attached to a different vehicle. The assembly makes it extremely difficult for theft of the trailer to occur. However, it has been found that theft will still occur through the negligence of the person using the trailer. Whether on purpose or by accident, the use of the locking assembly is sometimes neglected and thus theft can occur.

SUMMARY OF THE INVENTION

It is an object of the present invention to provide a device for use with a locking assembly and which device will function to remind the user to secure the locking assembly once the trailer has been detached from the cab or other towing vehicle.

According to one aspect of the present invention, there is provided a trailer for towing wherein the trailer has a hitch for attachment to a towing vehicle, the improvement comprising an anti-theft assembly for placement about the hitch, a lock to lock the anti-theft device in position about the hitch, and a reminder device to remind the user to place the anti-theft assembly in position, the reminder device comprising an enclosure, a noise emitter mounted within the enclosure, a control circuit mounted within the enclosure, and an actuator extending externally of the enclosure, the actuator being designed to be plugged into one of a first actuator receptor on a towing vehicle and a second actuator receptor on the anti-theft locking assembly, the noise emitter being activated when the actuator is unplugged from one of the receptors.

According to a further aspect of the present invention, there is provided a method for securing a trailer having a hitch comprising the steps of providing an anti-theft assembly designed to be placed on the hitch of the trailer, and providing a reminder device having an enclosure, a noise emitter mounted within the enclosure, a control circuit mounted within the enclosure, an actuator extending externally of the enclosure, the actuator being designed to be plugged into one of a first actuator receptor on a towing vehicle and a second actuator receptor on the locking assembly, the arrangement being such that the noise emitter is activated when the actuator is unplugged from one of the receptors.

The device of the present invention is designed to be used primarily with a conventional towing vehicle/trailer combination. The towing vehicle may range from an automobile to the cab of a semi-trailer. Similarly, the type of attachment between the vehicle and the trailer can be any of the known types such as a conventional trailer tong, a fifth wheel, a goose neck connection, etc. The locking assemblies may also be used with other vehicles such as snowmobiles and can further be utilized to secure the doors of a trailer to prevent unauthorized access thereto.

The device, as aforementioned, is secured to the trailer in the vicinity of where the anti-theft locking assembly is to be placed. The device includes a sound emitter and a control circuit, preferably along with a power source such as a suitable battery. In a preferred embodiment, the battery will be a lithium ion battery which, under normal circumstances, would have a life expectancy of ten years or more. The components are enclosed in a sealed weather proof enclosure or housing. Preferably, the enclosure is substantially tamper-proof and tamper evident to prevent unauthorized access thereto.

The noise emitter may be any suitable such as a horn, siren, electronic noise, or in the preferred embodiment, a piezoelectric noise generator. Preferably, the noise emitter is designed to emit a noise of sufficient volume to readily draw attention to the situation. To this end, a noise emitter will preferably emit a sound of at least 85 db.

There is also provided an actuator which is operatively connected to the electronic circuit and which actuator, when not plugged in to a specified receptacle, will cause the noise emitter to be activated. In order to deactivate the noise, the actuator can be plugged in either to the locking assembly or to the towing vehicle. Thus, immediately upon detachment of the trailer from the vehicle, the actuator must also be unplugged causing activation of the noise emitter. In order to stop the noise, the actuator must be plugged into a receptacle on the locking assembly.

BRIEF DESCRIPTION OF THE DRAWINGS

Having thus generally described the invention, reference will be made to the drawings illustrating an embodiment thereof, in which.

DETAILED DESCRIPTION OF THE INVENTION

Figure 1:
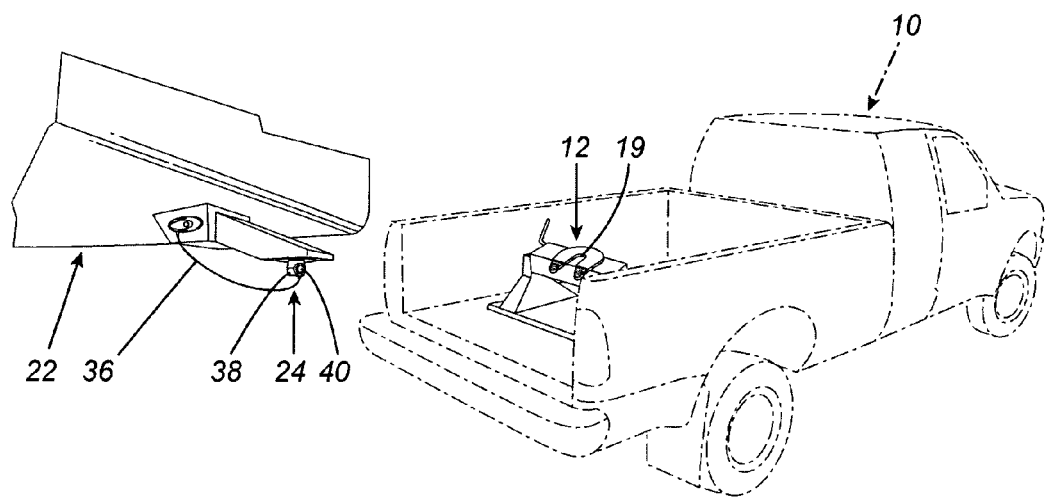
FIG. 1 is a view of a portion of the trailer and vehicle connection with the anti-theft locking assembly in place.

Referring to the drawings in greater detail and by reference characters thereto, there is illustrated in FIG. 1 a truck generally designated by reference numeral 10 and which includes a fifth wheel generally designated by reference numeral 12.

Fifth wheel 12 comprises a base plate 14 which is secured to the truck 10. A pair of support members 16 extend upwardly and support a coupling 18. Coupling 18 is of the known type including a horseshoe-shaped receptacle 19 and a locking bar 20.

A trailer 22 has a king pin (not shown) which engages with coupling 18. The above arrangement is a common one in the towing of trailers.

An anti-theft locking device 24 is mounted on the king pin of the trailer. In this respect, the anti-theft locking device may be such as shown in U.S. Pat. No. 7,040,646 and which is commercially available from the company AMP Lock Inc., and which is illustrated on the web site www.amplock.com.

Figure 3:
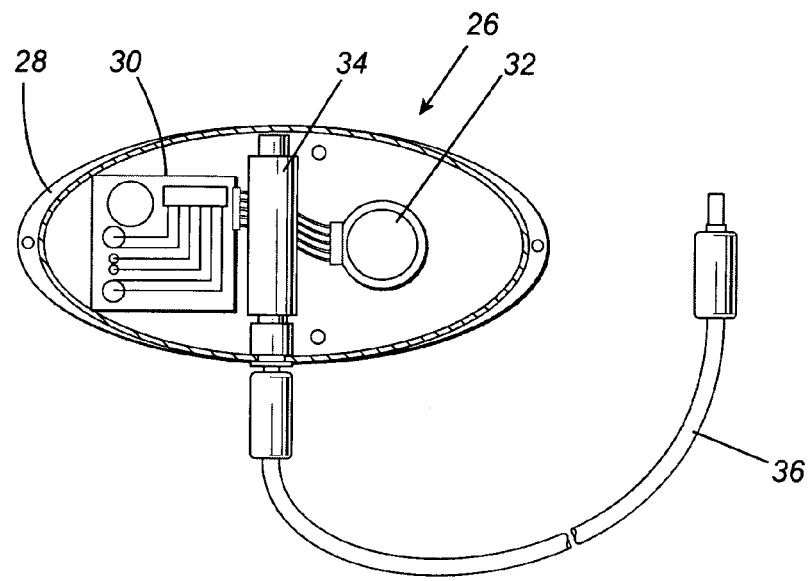
FIG. 3 is a view, partially in section, of the device according to the present invention.

Mounted on towing bar 23 of trailer 22 is a device generally designated by reference numeral 26. Device 26, as may be best seen in FIG. 3, has a housing 28 which encloses a control circuit 30, a noise emitter 32 and a battery 34. Extending outwardly from housing 28 is an actuator 36.

Housing 28 is preferably of the tamper proof variety such that the regular user cannot gain access thereto. Many tamper proof housings are known in the art. It will be seen that the housing may contain vents to permit sound from noise emitter 32 to pass therethrough.

Battery 34 is of the long lasting type preferably a lithium ion battery which, under most circumstances, will have a life in excess of 10 years. Control circuit 30 functions such that when actuator 36 is not plugged into a suitable receptor, noise emitter 32 is activated.

Figure 2:
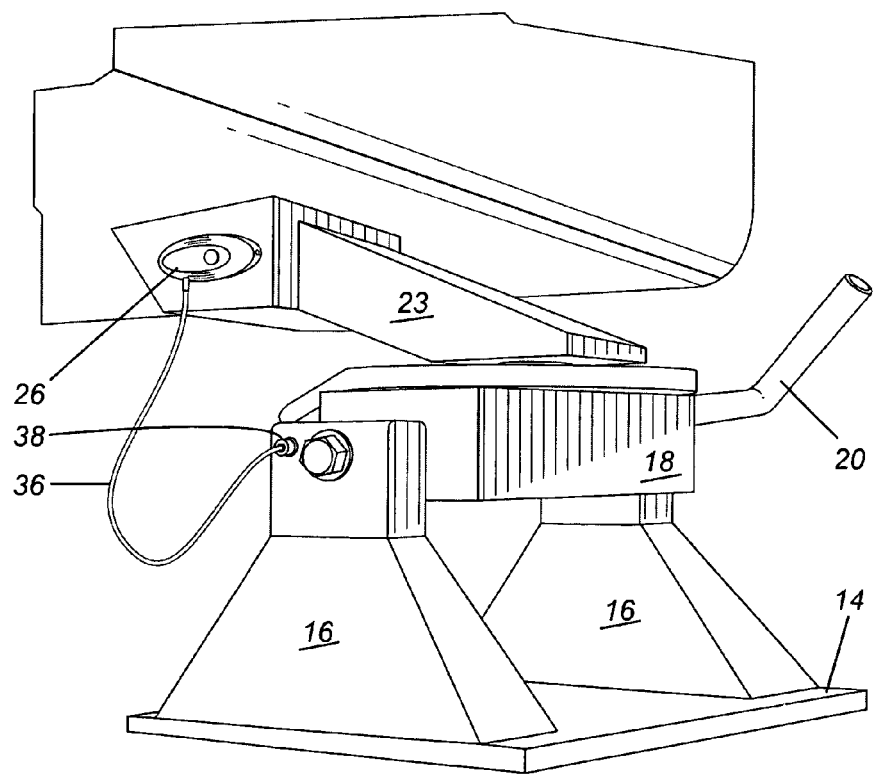
FIG. 2 is a view similar to FIG. 1 illustrating the trailer connected to the vehicle.

In use, and as may be seen in FIGS. 1 and 2, when the trailer is hooked to the truck 10, actuator 36 is plugged into a vehicle receptor 38. However, when trailer 22 is disconnected, anti-theft locking device 24 must be connected to the king pin of trailer 22 such that actuator 36 may be plugged into a receptor 40 in locking assembly 24.

In other words, when the trailer is disconnected, it is necessary to remove actuator 36 from vehicle receptor 38 and noise emitter 32 is activated to remind the user to connect anti-theft locking device 24. Naturally, if so desired, a time delay may be built in to control circuit 30 so that the operator is given a certain amount of time to connect the anti-theft locking device without noise emitter 32 being activated.

Figure 4:
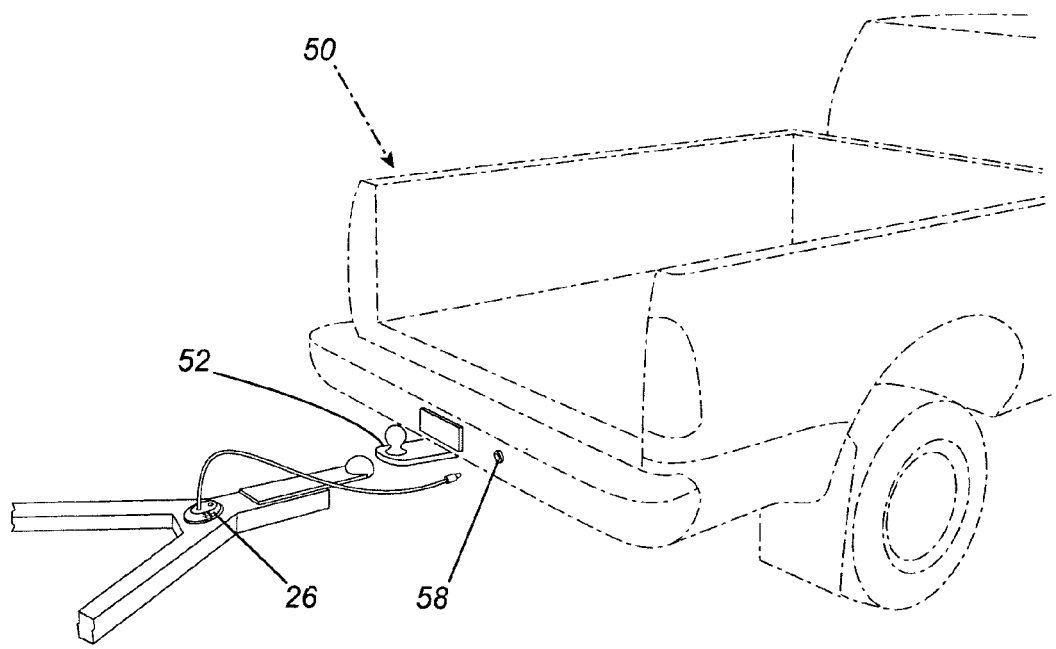
FIG. 4 is a perspective view of a portion of a trailer and vehicle utilizing the device.

As shown in FIG. 4, a pick-up truck 50 having a ball hitch 52 could likewise use the device. Trailer tow bar 54 contains a device 26 which can be plugged into vehicle receptor 58. An anti-theft locking assembly (not shown) can be used with coupler 56.

It will be understood that various types of actuators and receptors may be utilized. In one particular embodiment, both of the receptors must have a certain electrical resistance to prevent actuation of the noise emitting device. Naturally, other methods may be utilized.

It will be understood that the above described embodiments are for purposes of illustration only and that changes and modifications may be made thereto without departing from the spirit and scope of the invention.

I claim:

1. In a trailer for towing wherein the trailer has a hitch for attachment to a towing vehicle, said towing vehicle having a first actuator receptor, the improvement comprising:

an anti-theft assembly for placement about said hitch, a lock to lock said anti-theft assembly in position about said hitch, said anti-theft assembly including a second actuator receptor, and a reminder device to remind the user to place said anti-theft assembly in position, said reminder device comprising an enclosure, a noise emitter mounted within said enclosure, a control circuit mounted within said enclosure, and an actuator extending externally of said enclosure, said actuator being designed to be plugged into one of said first actuator receptor on said towing vehicle and said second actuator receptor on said anti-theft locking assembly, said noise emitter being activated when said actuator is unplugged from one of said receptors.

2. The device of claim 1 wherein said noise emitter is a piezoelectric noise emitter.

3. The device of claim 2 wherein said piezoelectric noise emitter emits sound at a level above 85 db.

4. A method for reminding a trailer user to use an anti-theft assembly when securing a trailer having a hitch to a towing vehicle having a first actuator receptor comprising the steps of: providing said anti-theft assembly designed to be placed on said hitch of said trailer, said anti-theft assembly including a second actuator receptor and providing a reminder device having an enclosure, a noise emitter mounted within said enclosure, a control circuit mounted within said enclosure, an actuator extending externally of said enclosure, said actuator being designed to be plugged into one of said first actuator receptor on a towing vehicle and said second actuator receptor on said anti-theft assembly, the arrangement being such that said noise emitter is activated when said actuator is unplugged from one of said receptors.

* * * * *